Dec. 8, 1953   E. J. HERBENAR   2,661,987
RESILIENTLY MOUNTED SHAFT HANGER ASSEMBLY
Filed Feb. 5, 1951
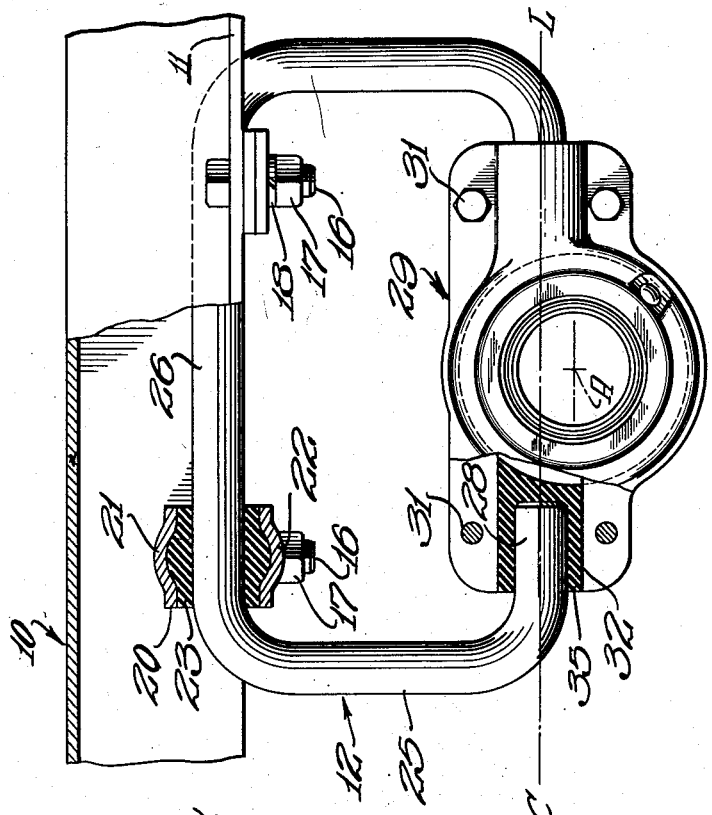
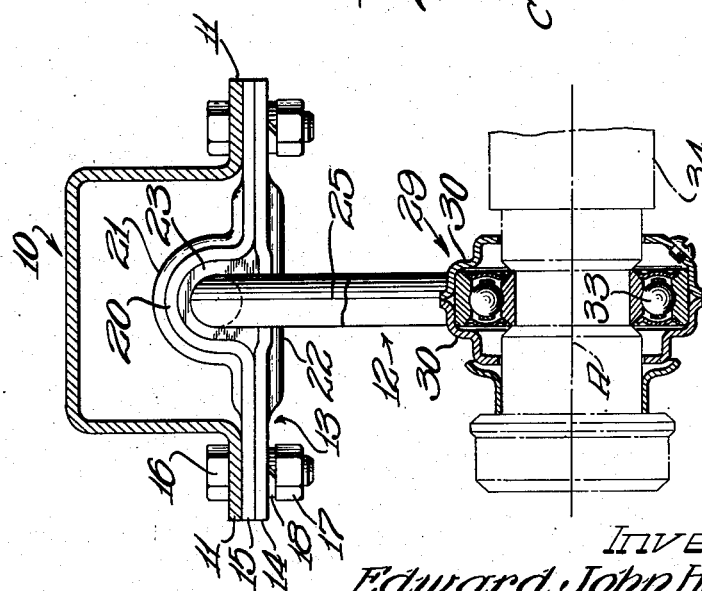
Inventor:—
Edward John Herbenar
by Hill, Sherman, Meroni, Gross & Simpson  Attys Patented Dec. 8, 1953

2,661,987

UNITED STATES PATENT OFFICE 2,661,987

RESILIENTLY MOUNTED SHAFT HANGER ASSEMBLY

Edward J. Herbenar, Detroit, Mich., assignor to Thompson Products, Inc., Cleveland, Ohio, a corporation of Ohio Application February 5, 1951, Serial No. 209,447

1 Claim. (Cl. 308—28)

This invention relates to a resiliently mounted shaft hanger assembly, and more particularly to a hanger assembly for the resilient mounting of a driven shaft, such as a propeller shaft of an automotive vehicle, or a propeller shaft extension.

In the mounting of propeller shafts, there are a number of factors that must be taken into consideration, including the need for accommodating limited universality of movement of the shaft bearing housing without imparting so much freedom of movement as to permit "whipping" of the shaft, and including the desirability of eliminating, or at least reducing as much as possible, the transmission of vibrations and of noise. The use of pre-loaded rubber bushings in the hanger structure for supporting the shaft hanger bearing housing offers the best possibility of solving the various problems that are involved.

In accordance with my present invention, pre-loaded rubber bushings are employed between the hanger and the supporting frame of the vehicle and between the hanger and the shaft bearing housing. Relative movement between the parts of the assembly is then accommodated solely through distortion of the rubber itself, and after the forces tending to effect such relative movement have been dissipated or have become spent, the resiliency of the bushings tends to return the assembly to its initial predetermined position with relation to the fixed points of support on said supporting frame. Such an arrangement provides both flexibility and also cushioning characteristics to the mounting assembly for the driven shaft.

In addition, the pre-loaded rubber bushings eliminate or reduce to a minimum, the transmission to the frame of the vehicle of vibrations, including those that result in sound, that are caused by propeller shaft conditions. Preferably, the rubber used in one set of bushings is of a different degree of hardness than the rubber used in another set of bushings. Since rubber bushings are similar to springs, the natural frequency of vibration of the bushings can be varied by changing the hardness of the rubber. Thus, by proper selection of differential hardness characteristics, as well as of the amount of pre-loading, or compression, to which the rubber of the bushings is subjected, the vibration frequency set up by the propeller shaft can be coordinated with that vehicle speed range at which such vibration frequency will have the least effect upon the vehicle frame. The vibration frequency of the bushings can be so selected that the vibrations of the propeller shaft will damp rather than augment the vibrations caused by other component parts of the vehicle.

It is, therefore, an important object of this invention to provide a resilient hanger assembly for the suspension of a shaft bearing housing, in which the joints between the hanger and the supporting frame and between the hanger and the bearing housing are provided with pre-loaded rubber bushings so arranged that relative movement between parts of assembly caused by the forces acting upon the bearing housing are accommodated through distortion of the rubber of the bushings.

It is a further important object of this invention to provide a resilient hanger assembly for the suspension of a propeller shaft bearing housing in which pre-loaded rubber bushings in the joints of the assembly effect a damping of the vibrations set up by the shaft and other component parts of the vehicle, thereby lessening the transmission of vibrations to the frame of the vehicle and also reducing the transmission of noise.

Other and further important objects of this invention will become apparent from the following description and appended claim.

As shown on the drawings:

Figure 1 is an elevational view of a resiliently mounted shaft hanger assembly embodying the principles of my invention, with parts broken away and in section.

Figure 2 is a view taken substantially at right angles to the view of Figure 1, with parts broken away and in section and with the stepped driven shaft shown in dotted lines.

On the drawings:

The reference numeral 10 indicates generally a channel-shaped frame or other supporting member. In the case of an automotive vehicle, the frame 10 may be a cross frame forming a part of the chassis or under carriage of the vehicle. Said channel frame 10 is mounted generally horizontally with its open side facing downwardly and with a pair of laterally extending flanges 11, 11 running along the open side of the channel and lying both in the same generally horizontal plane.

The hanger assembly, indicated generally by the reference numeral 12, is supported from the channel frame 10 by means of sub-assemblies 13, each comprising a generally flat strap 14 and a looped strap 15 extending across the open side of the channel frame 10 and secured to the flanges 11, 11, by means of bolts 16, nuts 17, and lock washers 18. The looped strap 15 is provided intermediate its ends with a closed loop portion 20 that extends into the interior of the channel frame 10. Said looped portion 20 is provided with a lengthwise extending, medially positioned arcuate portion 21, and the flat strap 14 is similarly provided with a longitudinally extending, medially positioned arcuate portion 22, bowed in an opposite direction to the arcuate portion 21. Within the closed loop portion so provided is positioned a pre-loaded rubber bushing 23. Said bushing 23 expands into and conforms with the contours of the bowed portions 21 and 22 to fill the space between the looped portion 20 and the central portion 22 of the flat strap 14. Any tendency of the rubber bushing 23 to be displaced endwise from the confining portions of the straps 14 and 15 is thus resisted by the intermediate, oppositely bowed strap portions 21 and 22. Although two such sub-assemblies 13 are shown, it will be understood that more may be employed, or only a single, elongated sub-assembly may be used in place of the two shown.

A hanger 25 is suspended from the channel frame 10 by means of the strap sub-assemblies 13, with the long side of the C-shaped hanger, indicated at 26, mounted in the pre-loaded rubber bushings 23. Said hanger 25 is preferably formed of an integral, generally cylindrical metal bar, bent into the form of a C, a median section through which lies wholly in single plane. The short end portions 28 of said hanger 25 are arranged in opposed, spaced, and aligned relationship, between which is mounted a bearing housing, indicated generally by the reference numeral 29.

Said bearing housing 29 comprises a pair of mating, stamped metal shells 30, 30 which provide, when assembled by means of bolts 31, a pair of aligned end sockets 32, 32, the centerline C—L of which is offset from the axis A of the housing.

Pre-loaded rubber bushings 35 are positioned in the end sockets 32, 32 for resiliently mounting the hanger ends 28. Said bushings 35 are thimble-shaped, with their inner ends closed and their outer ends receiving the end portions 28 of the hanger 25.

The housing 29 includes a ball bearing race 33, in which is journaled a stepped driven shaft 34. The specific details of the bearing housing 29 form no necessary part of this invention, other than with respect to the eccentric nature of the housing, as already explained.

From the foregoing description, it will be apparent that there are certain inherent features of adjustability in the shaft bearing hanger assembly of my invention. The vertical spacial relationship between the axis A of the housing and the channel frame 10 may be varied either by reversing the position of the strap sub-assembly 13 so that the closed loop portion extends downwardly, instead of upwardly, or by inverting the shaft bearing housing 29 so that the axis A of the housing is above, instead of below, the centerline C—L of the sockets. These adjustments can be made with great ease during the installation of the shaft hanger assembly.

The provision of the pre-loaded rubber bushings not only eliminates any metal-to-metal contact, since, of course, the strap sub-assembly 13, the hanger 25 and the bearing housing 29 are made of metal, but also accommodates the forces tending to displace the bearing housing through distortion of the rubber of the bushings. The stresses set up in the rubber bushings under the play of the forces acting upon the bearing housing 29 as transmitted to the housing from the shaft 34, tend to return the shaft bearing housing and hanger assembly to the position in which the assembly is initially installed. A limited amount of universality of movement of the bearing housing is thus made possible, while at the same time "whipping" of the shaft 34, such as might be caused by any unopposed movement of the shaft bearing housing is eliminated.

The pre-loaded rubber bushings 23 and 35 serve to damp the vibrations that would otherwise be transmitted from the driven propeller shaft 34 to the frame 10. The effective damping of vibrations is increased by making the bushings 23 and the bushings 35 of different degrees of hardness, as for instance making bushings 23 of a durometer hardness of 60, C-scale, and the bushings 35 of a durometer hardness of 40, also C-scale, or vice versa. By using rubber of different degrees of hardness for the upper and lower sets of bushings, respectively, the vibration frequency induced by the propeller shaft can be brought within a range for given vehicle speed range that has the least effect on the vehicle. In other words, the resiliency of the preloaded rubber bushings is controlled so that the bushings exert a maximum damping effect upon vibrations that would otherwise be transmitted from the propeller shaft to the vehicle frame, thereby largely eliminating objectionable vibrations and noises resulting therefrom.

It will be understood that modifications and variations may be effected without departing from the scope of the novel concepts of the present invention.

I claim as my invention:

In a hanger mounting assembly for suspending a driven shaft from a structural channel beam open on its lower side and having flanges extending therealong, brackets secured to said flanges spanning said open side and having spaced portions defining aligned openings, rubber bushings in said openings, a shaft bearing hanger in the form of an integral C having a straight cylindrical portion mounted in said bushings and having opposed spaced end portions in alignment with each other, a shaft bearing housing having aligned sockets for receiving said end portions and rubber bushings in said sockets mounting said end portions, wherein said first mentioned rubber bushings are of a degree of resiliency different from that of said second mentioned rubber bushings, and wherein all said rubber bushings are preloaded, whereby the transmission of vibrations from said drive shaft to said structural beam is effectively reduced.

EDWARD J. HERBENAR.

References Cited in the file of this patent
UNITED STATES PATENTS

| Number | Name | Date |
|---|---|---|
| 1,871,116 | Cummings | Aug. 9, 1932 |
| 2,450,279 | Guy | Sept. 28, 1948 |